(12) United States Patent
Kummer et al.

(10) Patent No.: US 11,342,707 B2
(45) Date of Patent: May 24, 2022

(54) STRAIN RELIEF FOR A CABLE HARNESS

(71) Applicant: U-SHIN DEUTSCHLAND ZUGANGSSYSTEME GMBH, Erdweg (DE)

(72) Inventors: Frank Kummer, Erdweg (DE); Armin Dietl, Erdweg (DE)

(73) Assignee: U-SHIN DEUTSCHLAND ZUGANGSSYSTEME GMBH, Erdweg (DE)

( * ) Notice: Subject to any disclaimer, the term of this patent is extended or adjusted under 35 U.S.C. 154(b) by 0 days.

(21) Appl. No.: 16/760,071

(22) PCT Filed: Oct. 19, 2018

(86) PCT No.: PCT/EP2018/078770
§ 371 (c)(1),
(2) Date: Apr. 29, 2020

(87) PCT Pub. No.: WO2019/086277
PCT Pub. Date: May 9, 2019

(65) Prior Publication Data
US 2020/0358223 A1   Nov. 12, 2020

(30) Foreign Application Priority Data
Oct. 30, 2017  (DE) ..................... 10 2017 125 416.1

(51) Int. Cl.
*H01R 13/58* (2006.01)
*H01R 13/518* (2006.01)

(52) U.S. Cl.
CPC ....... *H01R 13/5845* (2013.01); *H01R 13/518* (2013.01)

(58) Field of Classification Search
CPC ... H01R 13/518; H01R 13/58; H01R 13/5845
See application file for complete search history.

(56) References Cited

U.S. PATENT DOCUMENTS

| 2,963,536 | A |  | 12/1960 | Kokalas |
|---|---|---|---|---|
| 4,281,887 | A |  | 8/1981 | Luca, Jr. |
| 4,636,024 | A | * | 1/1987 | Yahata ................. H01R 13/595 439/449 |
| 4,737,122 | A | * | 4/1988 | Dechelette ............ H01R 24/60 439/418 |

(Continued)

FOREIGN PATENT DOCUMENTS

| DE |  | 3417811 C1 | 10/1985 |
|---|---|---|---|
| JP |  | S5654526 U | 5/1981 |
| JP |  | H11329567 A | 11/1999 |

*Primary Examiner* — Oscar C Jimenez
(74) *Attorney, Agent, or Firm* — Dilworth IP, LLC

(57) ABSTRACT

The invention relates to a strain relief for a cable harness, which is used to connect a part to electrical and/or electronic components, wherein the cable harness has at least two wires and wherein a stop component, is provided, which is made of plastic and tightly encloses the wires such that the stop component (20) is fixed immovably on the wires. The invention also relates to a part with a housing, a cable harness, which is guided into the housing, and a strain relief according to one of the preceding claims, wherein the housing has a receiver for the stop component, in which the latter is received in a positively-locking manner in at least one tensile direction.

10 Claims, 2 Drawing Sheets

(56) References Cited

U.S. PATENT DOCUMENTS

| | | | | |
|---|---|---|---|---|
| 4,795,229 | A | * | 1/1989 | Abendschein ....... G02B 6/3878 385/87 |
| 5,021,611 | A | * | 6/1991 | Amano .................... H01R 4/70 156/49 |
| 5,411,513 | A | * | 5/1995 | Ireland ............. A61B 17/32002 604/22 |
| 7,427,715 | B2 | * | 9/2008 | Kuo ................... H01R 13/5845 174/74 R |
| 2007/0099460 | A1 | * | 5/2007 | Holp ....................... B25B 27/10 439/157 |
| 2008/0045073 | A1 | * | 2/2008 | Kuo ................... H01R 13/5845 439/449 |
| 2017/0271811 | A1 | * | 9/2017 | Enomoto ............... H01R 13/56 |

* cited by examiner

STRAIN RELIEF FOR A CABLE HARNESS

The invention relates to a strain relief for a cable harness which is used to connect a part to electrical and/or electronic components. The invention also relates to a part with a housing, a cable harness which is guided into the housing, and a strain relief.

BACKGROUND OF THE INVENTION

A plurality of electrical and/or electronic devices exist, which are connected by means of a cable harness. Particularly in automobile manufacturing, it is known that electric motors, which are used for example in spindle drives or similar devices, are provided with a cable harness with which these are then connected to a control device.

In the pre-assembled state, thus when one end of the cable harness is for example connected to the electric motor, there is a risk that forces which ought to be kept away from the electrical and/or electronic components which are connected to the cable harness will take effect during transport or assembly. For example, a housing cover can already be slid onto the cable harness, and the wires of the cable harness can be plugged into a control board for the electric motor. To avoid damage to the control board, the housing cover should be prevented from exerting high forces on the plug-in connector of the cable harness and/or the control board.

SUMMARY OF THE INVENTION

The object of the invention is to develop a strain relief which on the one hand can be provided very easily and at low cost and on the other hand has a high resistance to tensile forces acting on the strain relief.

To achieve this object, a strain relief for a cable harness is provided according to the invention, which is used to connect a part to an electrical and/or electronic component, wherein the cable harness has at least two wires and wherein a stop component is provided which is made of plastic and tightly encloses the wires such that the stop component is fixed immovably on the wires. To achieve this object, there is also provided a part with a housing, a cable harness which is guided into the housing, and a stress relief as defined above, wherein the housing has a receiver for the stop component in which the latter is received in a positive-locking manner in at least one tensile direction. The invention is based on the basic idea of applying, in simple terms, a "thickening" to the cores of the cable harness, with which the housing component is prevented from moving beyond the point at which the stop component is located.

It is preferably provided that the stop component encloses all wires of the cable harness. In this way a maximum retention force is produced.

The stop component is preferably an injection-moulded part, with the result that it can be injection-molded onto the cable harness with little effort.

According to a preferred embodiment of the invention the stop component is made of a hot-melt adhesive. This results in a particularly high retention force of the stop component on the cable harness.

According to a preferred embodiment of the invention the receiver has a cross-sectional surface area that decreases from the inside to the outside of the housing. The receiver can in particular be conical. The decreasing cross-sectional surface area has the advantage that, when tensile forces are acting on the stop component, the receiver produces an inwardly directed clamping force, which increases the security with which the stop component adheres to the wires.

According to an embodiment of the invention the receiver can have a latching recess, in which a detent lug provided on the stop component can engage. This design guarantees that the stop component catches in a positive locking manner in the receiver, with the result that it seals off the passage of the cable harness through the housing there.

BRIEF DESCRIPTION OF THE DRAWINGS

The invention is described below with reference to an embodiment, which is represented in the attached drawings. There are shown in.

DETAILED DESCRIPTION OF THE INVENTION

Figure 1:
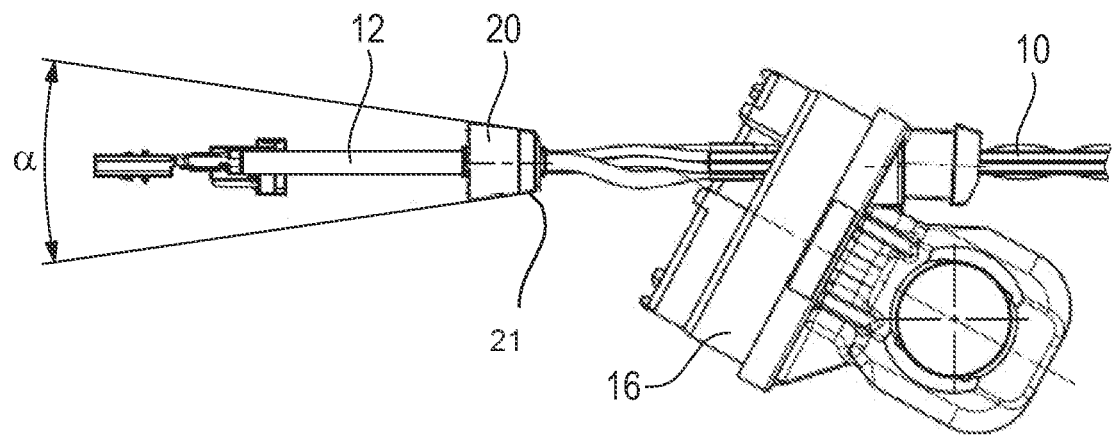
FIG. 1 a top view of a cable harness with stop component and housing.
Figure 2:
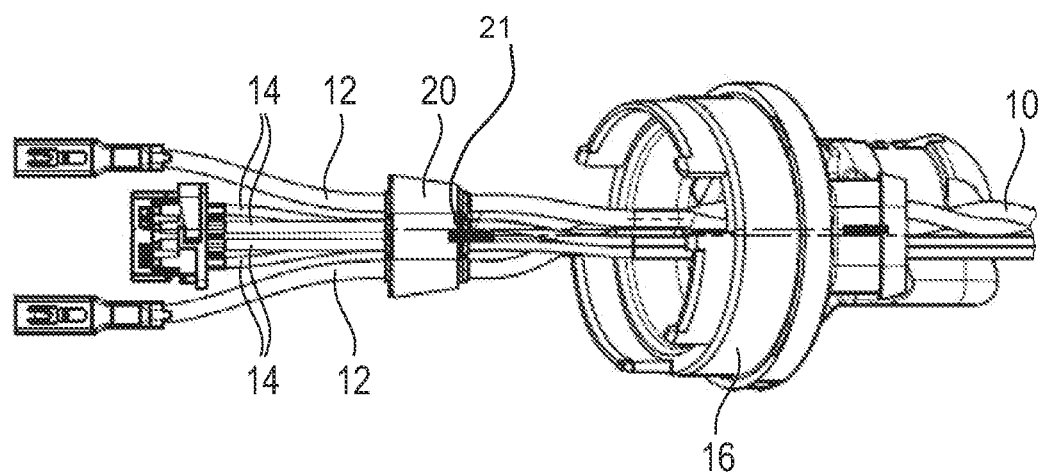
FIG. 2 a side view of the parts of FIG. 1.
Figure 3:
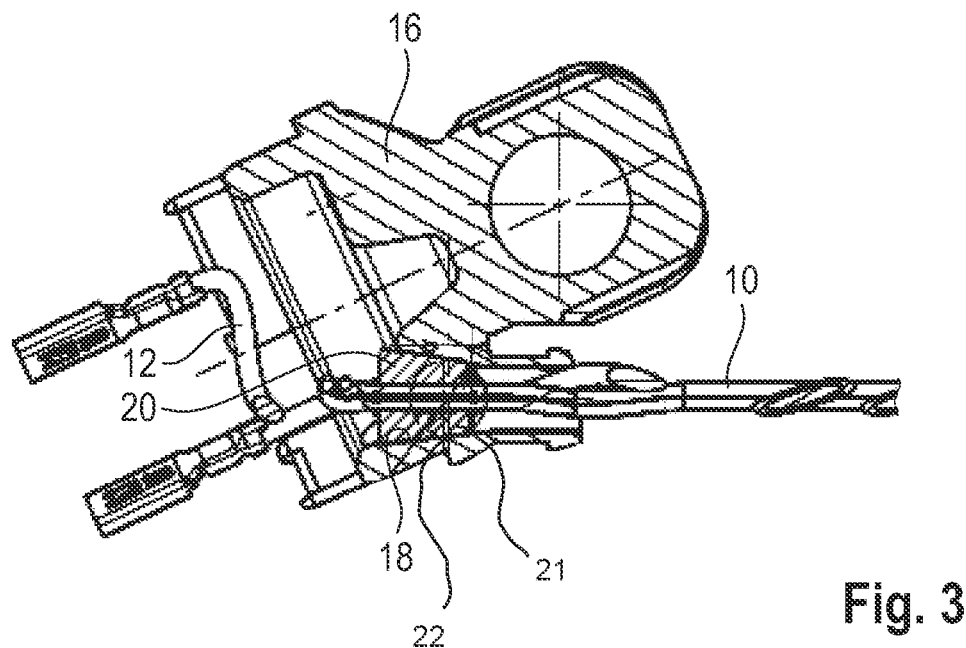
FIG. 3 a cross section through the housing in a state in which the stop component seals the receiver in the housing.
Figure 4:
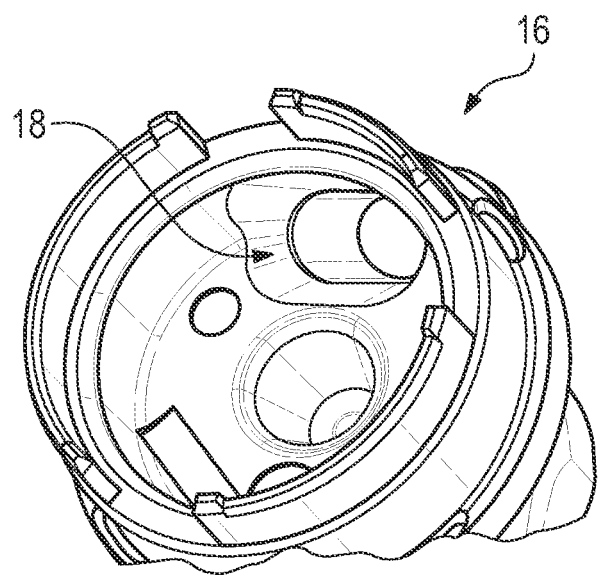
FIG. 4 a perspective view of the housing.

A cable harness 10 can be seen in FIGS. 1 to 3, which has two wires 12 in the example shown by means of which an electric motor, not shown here, can be supplied with electrical energy, as well as several wires 14 via which control and/or sensor signals can be transmitted.

In the fully assembled state the electric motor is arranged in a housing of which only a housing cover 16 can be seen here. The housing cover 16 is used among other things to feed the cable harness 10 through from the inside of the housing to the outside.

Specifically, the cable harness 10 is guided through a receiver 18, which, viewed in a cross section perpendicular to the feedthrough direction, has the shape of an elongated hole. When viewed along the feedthrough direction, the receiver 18 has a cross-sectional surface area which decreases from inside to outside. This can be seen in FIG. 3; the cross-sectional surface area is smaller on the right-hand side of the receiver 18 than on the left-hand side.

The cross-sectional surface area of the receiver 18 decreases evenly, with the result that a conical shape is formed as a whole.

A stop component 20, which is provided to cooperate with the receiver 18, is arranged on the cable harness 10. Accordingly, the stop component 20 has a conical outer shape (see FIGS. 1 and 2 in particular) which is adapted to the contour of the receiver 18 such that the stop component 20 can be tightly received in the receiver 18 (see FIG. 3 in particular). The receiver 18 can have a latching recess 22, in which a detent lug 21 provided on the stop component 20 can engage.

The taper angle $\alpha$ of the stop component 20 is preferably in the range of from 10° to 20°.

The stop component 20 is an injection-moulded part which encloses all wires of the cable harness 10. In other words: the stop component 20 has a circumferential outer contour within which all wires 12, 14 lie.

A hot-melt adhesive which has a very good adherence to the wires 12, 14 is particularly suitable as material for the stop component 20. It is hereby possible, without further measures, to achieve a retention force in the axial direction which lies significantly above 50 N even in test conditions with increased temperature (for example 45° C.) over a period of 30 seconds.

The stop component 20 thereby ensures that in the case of a pre-assembled cable harness the housing cover 16 cannot exert any forces on for example a control board which is mounted on the cable harness 10.

The invention claimed is:

1. A part of a spindle drive comprising a housing, a cable harness, which is guided into the housing, and a strain relief for the cable harness, which is used to connect the part to electrical and/or electronic components,
   wherein the cable harness has at least two wires and wherein a stop component is provided, which is made of plastic and tightly encloses the wires such that the stop component is fixed immovably on the wires,
   wherein the stop component is made of a hot-melt adhesive, and
   wherein the housing has a receiver for the stop component, in which the stop component is received in a positive-locking manner in at least one tensile direction.

2. The part according to claim 1, wherein the receiver has a cross-sectional surface area that decreases from an inside to an outside of the housing.

3. The part according to claim 2, wherein the receiver is conical.

4. The part according to claim 1, wherein the receiver has a latching recess into which a detent lug of the stop component can engage.

5. The part according to claim 1, wherein the stop component encloses all wires of the cable harness.

6. The part according to claim 1, wherein the stop component is an injection-molded part being injection-molded onto the cable harness.

7. The part according to claim 1, wherein the stop component has a detent lug.

8. The part according to claim 1, wherein the stop component has a conical outer surface that tapers evenly with a taper angle of 10° to 20°.

9. A strain relief for a cable harness, which is used to connect a part to electrical and/or electronic components,
   wherein the cable harness has at least two wires and wherein a stop component is provided, which is made of plastic and tightly encloses the wires such that the stop component is fixed immovably on the wires,
   wherein the stop component is made of a hot-melt adhesive, and
   wherein the stop component has a conical outer surface that tapers evenly with a taper angle of 10° to 20°.

10. The strain relief according to claim 9, wherein the stop component is an injection-molded part being injection-molded onto the cable harness.

\* \* \* \* \*